United States Patent [19]

Sarkar

[11] Patent Number: 5,790,859
[45] Date of Patent: Aug. 4, 1998

[54] METHOD OF, SYSTEM FOR, AND COMPUTER PROGRAM PRODUCT FOR EFFICIENT IDENTIFICATION OF PRIVATE VARIABLES IN PROGRAM LOOPS BY AN OPTIMIZING COMPILER

[75] Inventor: Vivek Sarkar, Palo Alto, Calif.

[73] Assignee: International Business Machines Corporation, Armonk, N.Y.

[21] Appl. No.: 576,173

[22] Filed: Dec. 21, 1995

[51] Int. Cl.$^6$ ........................................................ G06F 9/45
[52] U.S. Cl. ............................................ 395/704; 395/709
[58] Field of Search .................................. 395/705, 708, 395/709, 704

[56] References Cited

U.S. PATENT DOCUMENTS

| | | | |
|---|---|---|---|
| 4,773,007 | 9/1988 | Kanada et al. | 395/709 |
| 5,396,627 | 3/1995 | Iitsuka | 395/709 |
| 5,448,737 | 9/1995 | Burke et al. | 395/709 |
| 5,659,754 | 8/1997 | Grove et al. | 395/709 |

OTHER PUBLICATIONS

Sarkar, et al., "Automatic localization for distributed-memory multiprocessors using a shared-memory compilation framework," IEEE, Proc. of 27th Hawaii Int. Conf. on Sys. Sciences, vol. II: software tech., pp. 4–13, Jan. 7, 1994.
*Optimizing Supercompilers for Supercomputers*, Wolfe, M., p. 82, The MIT Press, Cambridge, 1989.
*Automatic Generation of DAG Parallelism*, Cytron, R.; Hind, M.; Hsieh, W., ACM, 1989.
*Array Privatization for Parallel Execution of Loops*, Li, Zhiyuan, 1992 International Conference on Supercomputing, 1992, pp. 313–322.
*Data Dependence and Data Flow Analysis of Arrays*, Maydan, D.; Amarsinghe, S.; Lam, M., Languages and Compilers for Parallel Computing, 5th International Workshop Proceedings, 1993, pp. 434–448.
*Automatic Array Privatization*, Tu, P.; Padua, D., Languages and Compilers for Parallel Computing 6th International Workshop Proceedings, 1994, pp. 500–521.
*Flow Sensitive Interprocedural Analysis Method for Parallelization*, Iitsuka, T., IFIP Transactions A, Computer Science and Technology, vol. A23, 1993, pp. 65–76.
*Non Linear Array Dependence Analysis*, Pugh, W.; Wonnacott, D., Languages, Compilers and Run Time Systems for Scalable Computers, 1995, pp. 1–14.

*Primary Examiner*—Emanuel Todd Voeltz
*Assistant Examiner*—Peter J. Corcoran, III
*Attorney, Agent, or Firm*—Prentiss W. Johnson

[57] ABSTRACT

Privatization or identification of private variables in single-entry strongly connected regions or program loops by the use of dummy identity assignment statements. Dummy identity assignment statements, V=V, are inserted in the header block and postexit blocks of each single-entry strongly connected region for each variable V with a definition in the single-entry strongly connected region (SCR). USE functions of the dummy identity assignment statements are determined. The dummy definition of a variable in an SCR header block is used to test if there exists a loop-carried flow dependence on the variable in the SCR. Dummy definitions of the variable in postexit blocks of the SCR are used to test if the variable would require to be copied out on exit from the SCR. The dummy definition of the variable in header block of the SCR is used to test if only the last iteration value of the variable needs to be copied out. A variable is ascertained to be private if there is no loop carried dependence on the variable in the SCR, and either no copy out of the variable on exit from the SCR, or copy out of the variable on exit from the SCR and only the last iteration needs to be copied. The execution time and memory required for identifying private variables in single-entry strongly connected regions are substantially reduced. The execution time to determine if a variable is private in an SCR is at worst linearly proportional to the number of definitions and uses of the variable in a control flow graph.

18 Claims, 12 Drawing Sheets

```
{   int i, v, a[n], b[n], c[n], d[n];
    double e[n], f[n];
    .../* initialization for a,b,c,d,e,f */ for (i = 0; i < n; i++) {
        if (i & 1)
            v = a[i];
        else
            v = b[i];
        while (c[v] != d[v])
            v = c[v];
        e[i] = f[i] + v;
    }
    printf ("%d \n", v);
}
```

METHOD OF, SYSTEM FOR, AND COMPUTER PROGRAM PRODUCT FOR EFFICIENT IDENTIFICATION OF PRIVATE VARIABLES IN PROGRAM LOOPS BY AN OPTIMIZING COMPILER

A portion of the Disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention relates in general to a computer program analysis method for use by an optimizing or parallelizing compiler or by a computer program analysis tool, and more particularly to a technique for efficiently identifying private variables in the loops or strongly connected regions of a computer program.

2. Description of the Related Art

The importance of identifying private variables in program loops has been highlighted in the prior art. Without this analysis, an optimizing or parallelizing compiler may be unable to apply many well-known loop transformations that operate on counted loop structures such as the Fortran DO loop. These loop transformations (e.g., interchange, tiling, outer-loop unrolling, vectorization, and parallelization) are recognized as being essential for delivering high performance on modern uniprocessor and multiprocessor systems.

For some transformations (e.g. loop parallelization), a storage duplication transformation has to be performed on a variable that is identified as private. The term "privatization" has been used in the prior art to refer to both the identification of private variables as well as any necessary storage duplication.

Identification of private variables is also important for general unstructured program loops that are manifested as a single-entry strongly connected region (SCR) in a control flow graph of the input program. The effectiveness of program transformations on an SCR, such as software pipelining, is reduced in the absence of private variable identification.

Note that a structured loop, such as a Fortran DO, is also a single-entry strongly connected region (SCR) in the control flow graph of the input program. Therefore, the terms "SCR" or "loop" are used interchangeably to refer to all loops (structured or unstructured) found in a program.

Privatization optimization may be understood by reference to the optimizing compiler art. FIG. 1 illustrates a procedure for translating a program 10 to create an executable binary object program 12. A lexical/syntax analysis 14 is conducted to transform source program 10 to a first intermediate language program 16. First intermediate language program 16 is then processed by an optimization routine 18 to create a second intermediate language program 20, which is then directly interpreted by the code generation routine 22 to create object program 12.

Optimization routine 18 is illustrated in FIG. 2 as it is understood in the art. Optimization processing is achieved by first performing a control flow analysis in routine 24 of first intermediate language 16. Control flow analysis routine 24 provides the control flow data 26, which are then passed to a data-flow analysis routine 28 wherein first intermediate language program 16 is analyzed for data flow. Data-flow analysis routine 28 produces the data-flow data 30. Finally, a program transformation procedure 32 accepts control flow data 26, data-flow data 30, and first intermediate language program 16 to produce second intermediate language program 20. Optimization routine 18 may use privatization to enable the program transformation procedure 32 to perform various optimizations such as loop interchange or loop parallelization.

Conventional methods of privatization or private variable analysis performed by optimization routine 18 are described on classical data structures for linking definitions and uses of variables. The execution time of these conventional methods to determine if a variable is private in a loop is usually quadratic in the number of definitions and uses of the variable. This makes identification of private variables a time consuming procedure, and makes it expensive to repeat the identification of private variables on all loops and variables of interest.

This quadratic nature of conventional optimization routine 18 privatization may be better understood by considering the following typical convention implementation. Optimization routine 18 may use the control flow data 26 and the data-flow data 30 to construct a data dependence graph in which a node is created for each statement, and in which an edge is created from a node S1 to a node S2 if there is a flow/anti/output data dependence from statement SI to statement S2. If there is a data dependence, then the edge is labeled with information on the variable causing the dependence.

An edge may be a self-loop (when S2=S1), and also there may be multiple edges with the same source and destination nodes in which case, the data dependence graph is a multigraph. A data dependence graph may be constructed at different granularities, e.g., a graph on the statements contained within a loop, a graph on all statements in a procedure/function, a graph in which sub-loops are collapsed into single super-node "statements", etc. In general, a data dependence graph with N nodes may have $O(N^{**}2)$ dependence edges for a given variable V.

After construction of the data dependence graph, conventional optimization routine 18 may use the data dependence graph to test for loop-carried flow dependence in a loop R, in which each dependence edge in the data dependence graph is examined for a particular variable V to determine if there exists an edge representing a loop-carried flow dependence on variable V in loop R.

Although this procedure is simple to code, it requires extensive processor resources (time and memory) because all $O(N^{**}2)$ edges may need to be examined for a given variable. Also, unlike the USE and DEF sets which are specific to a single variable, the dependence graph is built across all variables, and the procedure has to in general examine edges for all variables and filter out the edges specific to a particular variable V, thus increasing the execution time by a multiplicative factor that may equal the number of variables.

Conventional optimization routine 18 may also use the data dependence graph to test for liveness on exit in which each dependence edge for variable V with a source node in loop R and a destination node outside loop R, is examined to see if there exists an edge representing a flow dependence which indicates that the value of V is live on exit. As before, this requires extensive processor resources because it may involve examining $O(N^{**}2)$ edges. Also, the dependence graph for an entire program is more time-consuming to compute and examine than the dependence graph for a single loop.

Many methods for performing privatization according to the above conventional techniques are known in the art. For instance, Wolfe (Michael J. Wolfe, *Optimizing Supercompilers for Supercomputers*, p. 82, The MIT Press, Cambridge, Mass., 1989) suggests that identification of private variables played an important role in vectorizing compilers. Wolfe teaches identification of private variables in vectorizing compilers by using a data dependence graph, and by using a scalar expansion transformation to obtain storage duplication for a private scalar variable needed to enable vector execution. Wolfe's teachings of the use of data dependence graphs for identification of private variables yields the quadratic-time execution time behavior discussed above.

Cytron et al. (Ron Cytron, Michael Hind, and Wilson Hsieh, "Automatic Generation of DAG Parallelism", ACM, 1989) also teaches a technique for identification of private variables in loops and in cobegin/coend blocks. As with past vectorizing compilers, the technique for identification of private variables in loops takes quadratic-time because of its use of the data dependence graph.

The quadratic time techniques of the prior art for identification of private variables cannot be directly used to identify array and pointer references as private, and are thus also known as scalar privatization techniques. However, in many cases, a scalar replacement transformation may first be performed to replace some array and pointer references by compiler-generated scalar temporary variables, which may then in turn be identified as private variables by the scalar privatization techniques. Examples of prior art on array privatization can be found in Li ( Zhiyuan Li, "Array Privatization for Parallel Execution of Loops", 1992 International Conference on Supercomputing, 1992, p.313–322); Maydan et al. (D. Maydan, S. Amarsinghe, M. Lam, "Data Dependence and Data Flow Analysis of Arrays", Languages and Compilers for Parallel Computing, 5th International Workshop Proceedings, 1993, p.434–448); Tu et al. (P. Tu and D. Padua, "Automatic Array Privatization", Languages and Compilers for Parallel Computing 6th International Workshop Proceedings, 1994, p.500–521); Iitsuka (T. Iitsuka, "Flow Sensitive Interprocedural Analysis Method for Parallelization", IFIP Transactions A, Computer Science and Technology, vol. A 23, 1993, p.65–76); and Pugh et al.(W. Pugh and D. Wonnacott, "Non Linear Array Dependence Analysis", Languages, Compilers and Run Time Systems for Scalable Computers, 1995, p.1–14). These array privatization techniques may yield more precise analysis in the identification of private array variables than the use of a scalar replacement pre-pass, but do not offer any benefits in precision or execution time for the identification of private scalar variables. These array privatization techniques are also known to be even more time-consuming than the quadratic-time scalar privatization techniques.

Conventional methods for identifying private variables in program loops have large execution times, usually quadratic in the number of definitions and uses of the variable. Thus, conventional privatization methods provide no efficient technique for identifying private variables in program loops, and as such, there is a clearly felt need for a method of, system for, and computer program product for, providing efficient identification of private variables in program loops.

SUMMARY OF THE INVENTION

The invention disclosed herein comprises a method of, a system for, and an article of manufacture for identifying private variables in program loops. The method, system, and article of manufacture described herein substantially reduce the execution time required for identifying private variables in program loops.

The method of the present invention can determine if a variable is private in a loop with an execution time that is at worst linearly proportional to the number of definitions and uses of the variable in a control flow graph, and that may be faster in actual practice.

In accordance with one aspect of the present invention, a dummy identity assignment statement is inserted in the header block of each single-entry strongly connected region for each variable that has a definition in the single-entry strongly connected region.

In accordance with another aspect of the present invention, a dummy identity assignment statement is inserted in the postexit blocks of each single-entry strongly connected region for each variable that has a definition in the single-entry strongly connected region.

In accordance with another aspect of the present invention, USE functions are determined for the inserted dummy identity assignment statements.

In accordance with another aspect of the present invention, a dummy definition of a variable in a header block of a single-entry strongly connected region is used to test if there exists a loop-carried flow dependence on the variable in the single-entry strongly connected region.

In accordance with another aspect of the present invention, a dummy definition of a variable in a postexit block of a single-entry strongly connected region is used to test if a variable is required to be copied out on exit from the single-entry strongly connected region.

In accordance with another aspect of the present invention, a dummy definition of a variable in a header block of a single-entry strongly connected region is used to test if only a last iteration value of a variable needs to be copied out.

In accordance with another aspect of the present invention, a dummy definition of a variable is used to determine that the variable is private if there is no loop carried dependence of the variable, and either: no copy out on exit of the variable, or copy out on exit of the variable and only a last iteration of the variable needs to be copied.

The present invention has the advantage of providing improved compiler optimization.

The present invention has the further advantage of providing improved identification of private variables.

The present invention has the further advantage of providing improved execution time for identification of private variables.

The present invention has the further advantage of providing an improved execution time which is less than quadratically proportional to the number of definitions and uses of a variable in a control flow graph.

The present invention has the further advantage of providing an improved execution time which is at worst linearly proportional to the number of definitions and uses of the variable in a control flow graph.

BRIEF DESCRIPTION OF THE DRAWINGS

For a more complete understanding of the present invention and the advantages thereof, reference is now made to the Description of the Preferred Embodiment in conjunction with the attached Drawings, in which.

DESCRIPTION OF THE PREFERRED EMBODIMENT

Figure 1:
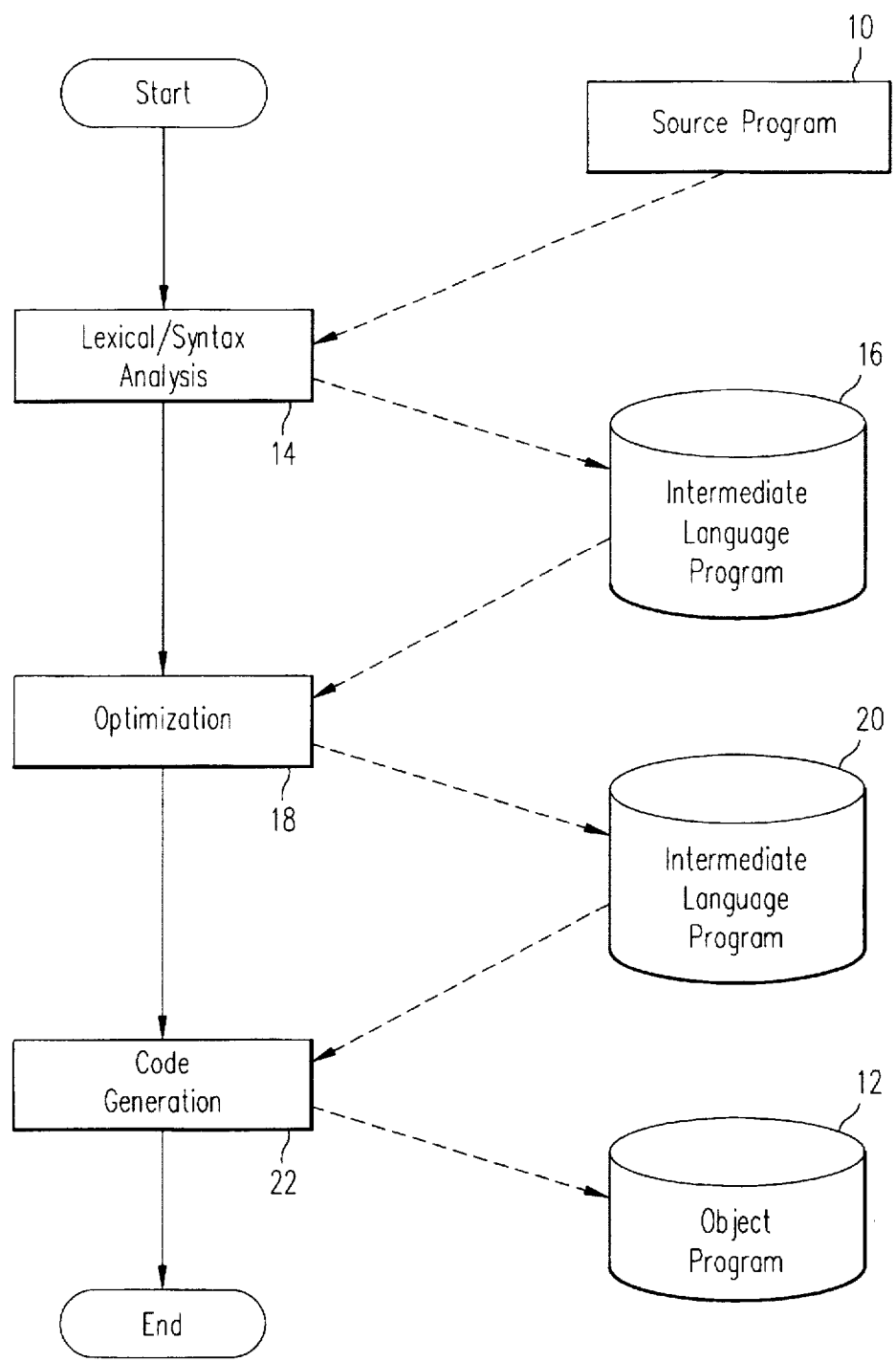
FIG. 1 shows a functional block diagram of an exemplary compiling method from the prior art.
Figure 2:
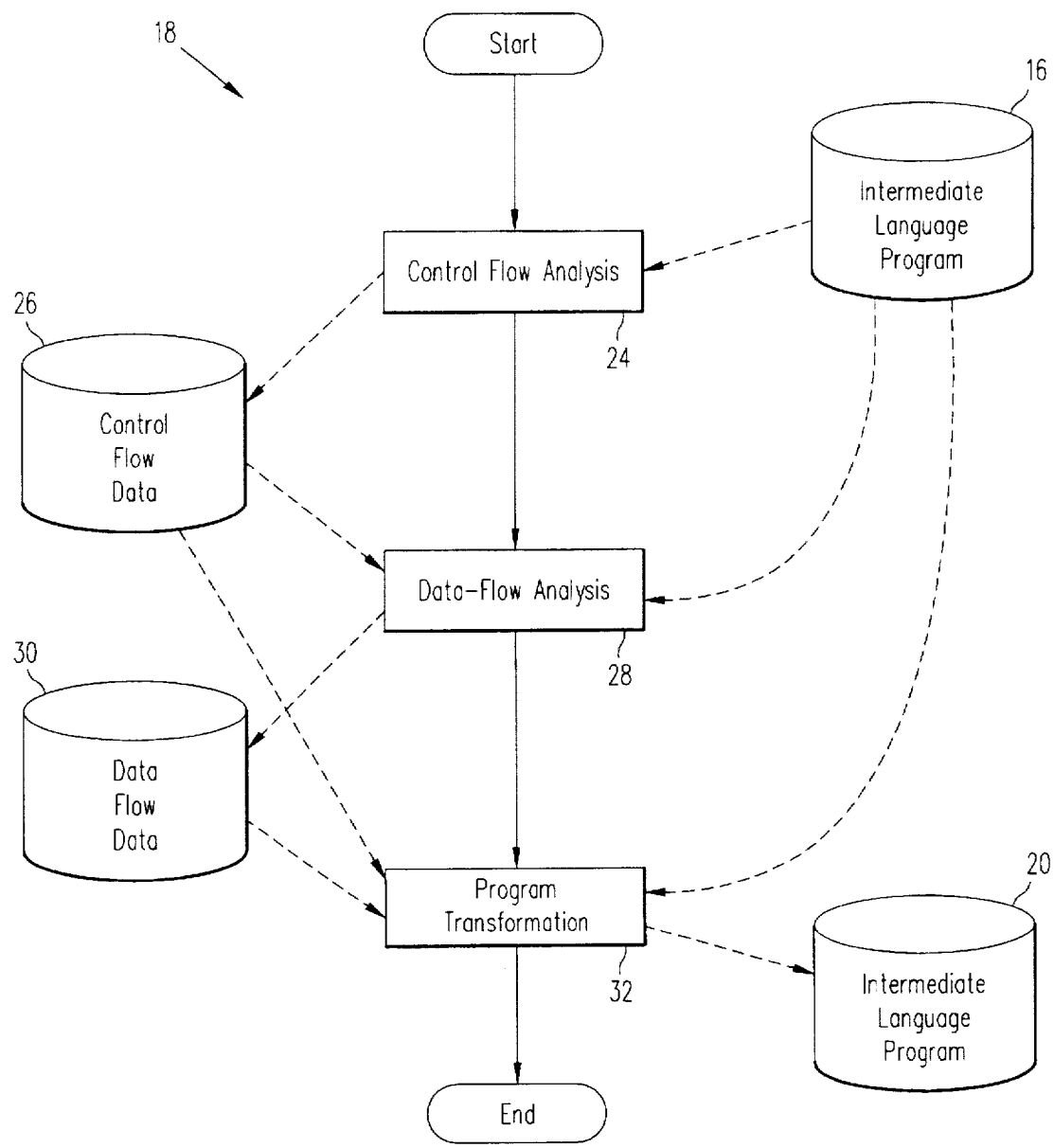
FIG. 2 shows a functional block diagram of an exemplary compiling optimization method from the prior art.
Figure 3:
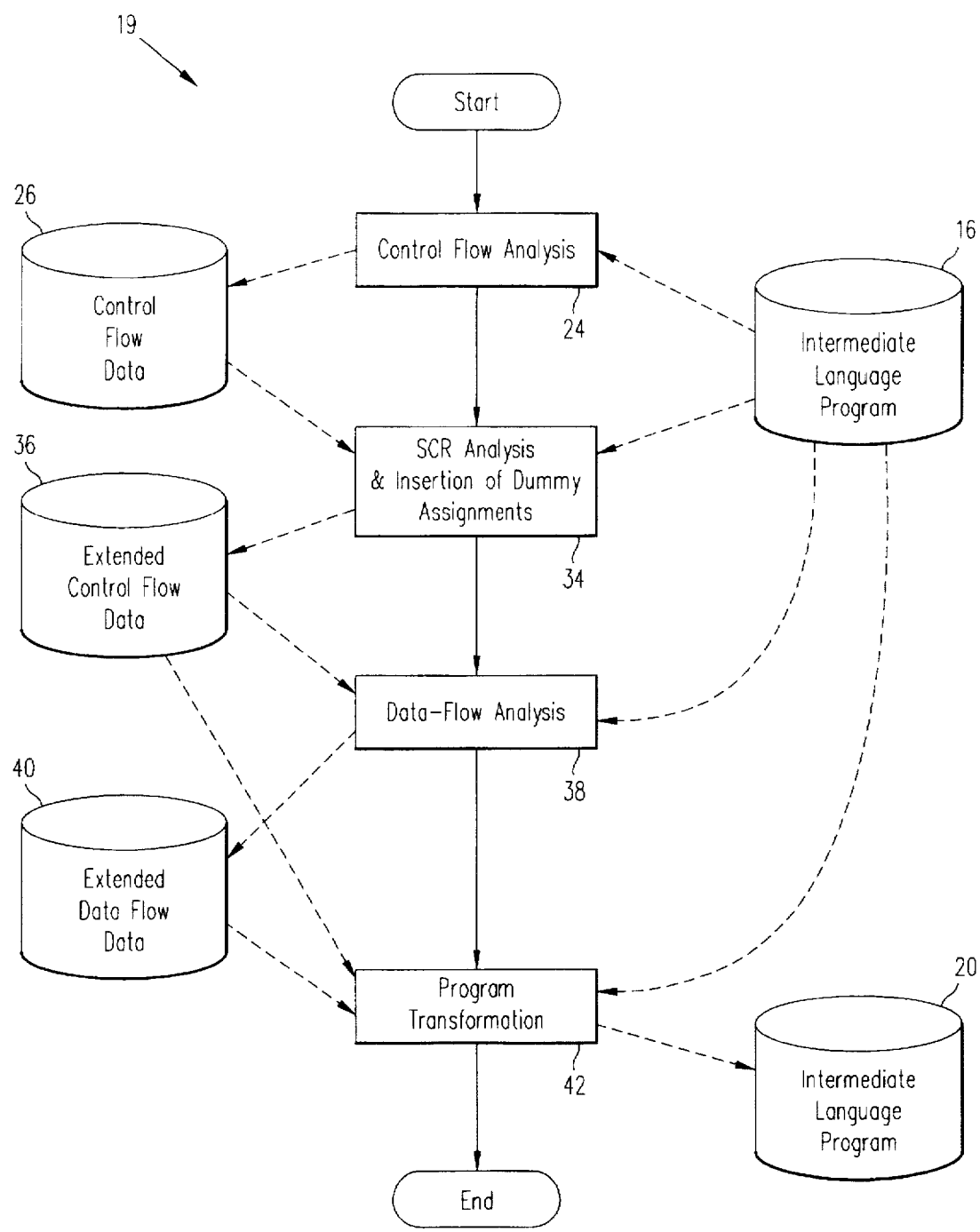
FIG. 3 shows a functional block diagram of a compiling optimization method in accordance with the present invention.

Referring now to FIG. 3, a functional block diagram of a compiling optimization method 19 in accordance with the present invention is shown. Compiling optimization method 19 differs from that of the prior art 18 by the addition of a block 34 for performing SCR analysis and insertion of dummy assignments. Block 34 inserts a dummy identity assignment statement in the header block of each single-entry strongly connected region for each variable that has a definition in the single-entry strongly connected region. Block 34 may also insert a dummy identity assignment statement in the postexit blocks of each single-entry strongly connected region for each variable that has a definition in the single-entry strongly connected region. Responsive to the insertion of the dummy identity assignment statements, Block 34 also creates novel extended control flow data 36. Novel data flow analysis 38 uses novel extended control flow data 36 and determines USE functions of inserted dummy identity assignment statements creating novel extended data flow data 40. Novel program transformation 42 analyzes extended control data 36 and extended data flow data 40 to identify private variables. The analysis of program transformation 42 comprises using a dummy definition of a variable in a header block of a single-entry strongly connected region to test if there exists a loop-carried flow dependence on the variable in the single-entry strongly connected region; using a dummy definition of the variable in a postexit block of the single-entry strongly connected region to test if the variable is required to be copied out on exit from the single-entry strongly connected region; and using the dummy definition of the variable in the header block of the single-entry strongly connected region to test if only a last iteration value of the variable needs to be copied out. Program transformation 42 identifies the variable as private in the single-entry strongly connected region if there is no loop carried dependence of the variable, and either: no copy out on exit of the variable, or copy out on exit of the variable and only a last iteration of the variable needs to be copied.

Referring next to FIG. 4, FIG. 5, and FIG. 8 through FIG. 11, flowcharts illustrating operations preferred in carrying out the present invention are shown. In the flowcharts, the graphical conventions of a diamond for a test or decision and a rectangle for a process or function are used. These conventions are well understood by those skilled in the art, and the flowcharts are sufficient to enable one of ordinary skill to write code in any suitable computer programming language.

Figure 4:
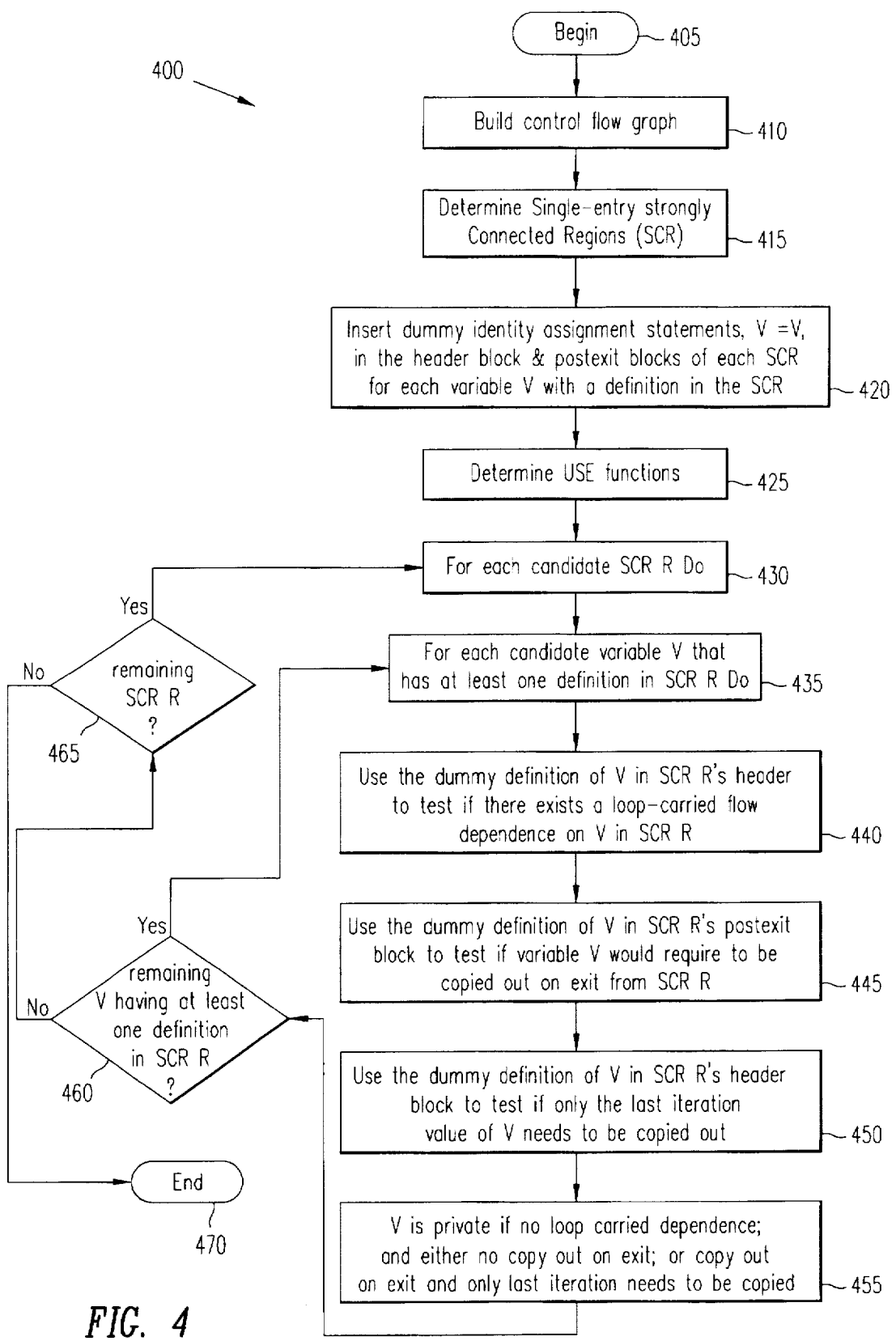
FIG. 4 shows a flowchart of the operations preferred in carrying out the Identification of Private Variables in accordance with the present invention.

Referring first to FIG. 4, the operations preferred in carrying out the present invention 400 are illustrated. The process begins at process block 405, and thereafter, process block 410 builds a control flow graph of the program being optimized. Techniques for building a control flow graph are well known by those skilled in the art. Thereafter, process block 415 identifies single-entry strongly connected regions (SCR) in the control flow graph. This identification of single-entry strongly connected regions in the control flow graph may be performed by techniques well known to those skilled in the art. Thereafter, process block 420 inserts dummy identity assignment statements, V=V, in the header block and postexit blocks of each SCR for each variable V with a definition in the SCR. The header block of an SCR is the unique basic block within the SCR which has predecessors not contained in the SCR. A postexit block of an SCR is the target of an edge that exits the SCR. It is assumed that the exit edge is the only incoming edge for a postexit block. If this condition is not satisfied for some exit edges, the control flow graph may be modified to satisfy the condition by the addition of an empty postexit block on each such edge. This will be apparent to those skilled in the art.

Figure 6:
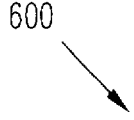
FIG. 6 shows a sample program on which the present invention may be applied to perform private variable identification.
Figure 7:
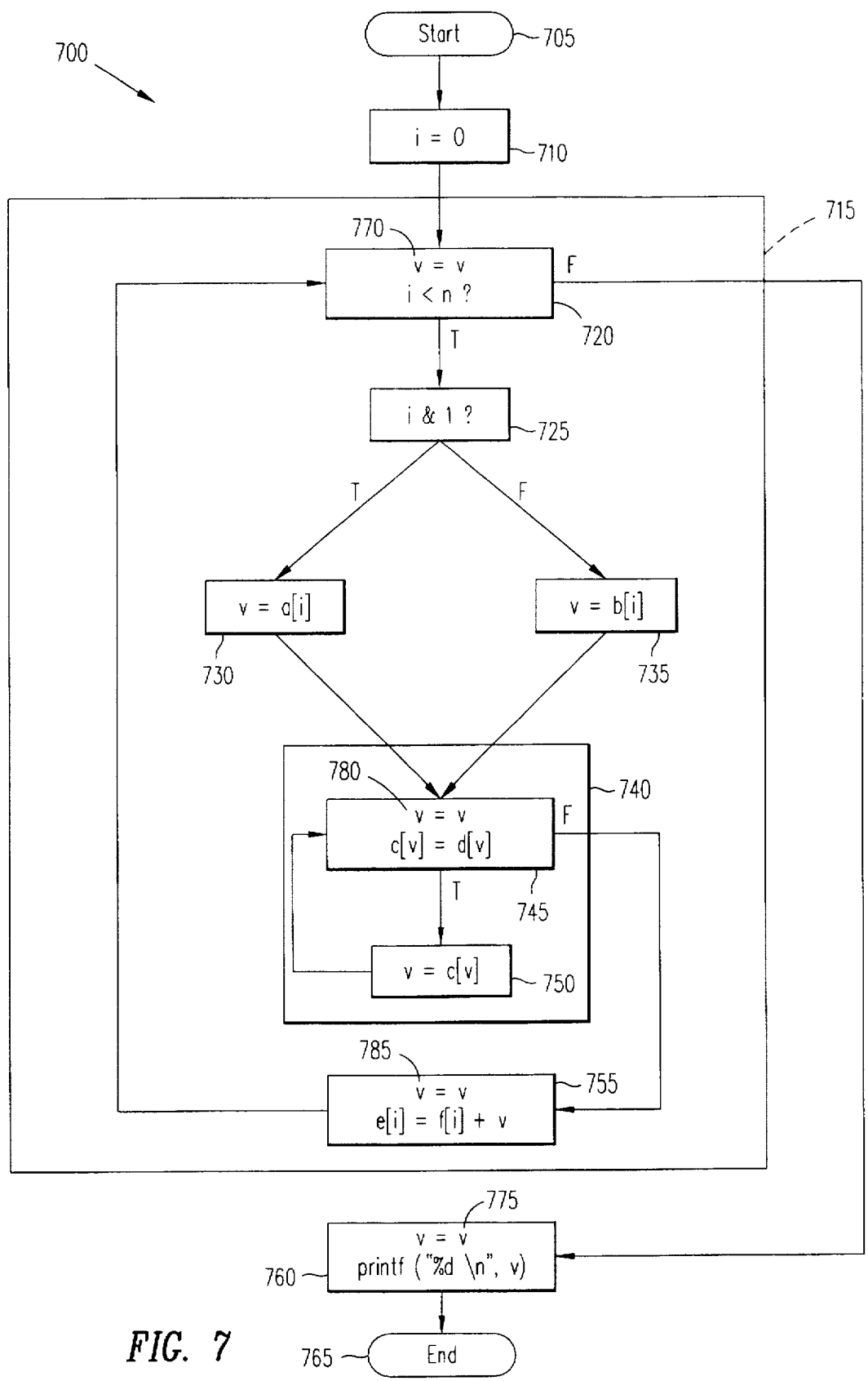
FIG. 7 shows a control flow graph of the sample program of FIG. 6 in which Dummy Identity Assignment Statements are inserted in accordance with the present invention.

By way of example, FIG. 7 illustrates a control flow graph 700 of a sample program 600, written in the C programming language, and illustrated in FIG. 6. The control flow graph 700 begins at basic block 705 and after basic block 710, there is a single-entry strongly connected region 715 corresponding to the for-loop 610 of the sample program 600. SCR 715 has a header block 720 and a postexit block 760, and thereafter, the control flow graph ends at basic block 765. SCR 740, corresponding to the while-loop 620 of the sample program 600, has a header block 745, and a postexit block 755. SCR 740 comprises basic blocks 745 and 750. SCR 715 comprises basic blocks 720, 725, 730, 735, 745, 750, and 755.

In the practice of the present invention, process block 420 inserts a dummy identity assignment statement, V=V, 770 in the header block 720 of SCR 715 and another dummy identity assignment statement, V=V, 775 in the postexit block 760 of SCR 715 for a variable V with a definition in the SCR 715. Process block 420 also inserts a dummy identity assignment statement, V=V, 780 in the header block 745 of SCR 740 and another dummy identity assignment statement, V=V, 785 in the postexit block 755 of SCR 740 for the variable V with a definition in the SCR 740.

Returning now to FIG. 4, after process block 420 inserts the dummy identity assignment statements, process block 425 determines USE functions for the uses and definitions of variable V in control flow graph 700. A USE of a variable is a program point where the variable is used as an operand, for example where the variable is on the right hand side (RHS) of an assignment. A DEF or definition of a variable V is a program point where the variable V is computed or updated, for example where the variable is on the left hand side (LHS) of an assignment. A USE function for a definition D identifies all uses where the object computed at D is used as an operand, and links all such uses to the definition D.

After the determination of USE functions by process block 425, process block 430 starts a loop for each candidate SCR R, and nested within this loop, process block 435 starts a loop for each candidate variable V that has at least one definition in the SCR R. Within this inner loop, process blocks 440, 445, 450, and 455 utilize the definitions of the dummy identity assignment statements to determine if the variable V is private within SCR 715 and if the variable V is private within SCR 740. Process block 440 utilizes the dummy definition of a variable in an SCR header block to test if there exists a loop-carried flow dependence on the variable in the SCR. Thereafter, process block 445 utilizes the dummy definition of the variable V in SCR R's postexit blocks to test if the variable would require to be copied out on exit from the SCR, i.e., process block 445 tests for liveness of the variable on exit from the SCR. After the liveness test, process block 450 utilizes the dummy definition of the variable V in SCR R's header block to test if only the last iteration value of the variable needs to be copied out. Thereafter, process block 455 utilizes the results produced by process blocks 440, 445, and 450 to determine if a variable is private. Process block 455 ascertains that a variable is private if there is no loop carried dependence on the variable in the SCR, and either no copy out of the variable on exit from the SCR, or copy out of the variable on exit from the SCR and only the last iteration needs to be copied. Application of the present invention to the sample program 600 of FIG. 6 yields that variable V is private in SCR 715 as the method determines that there is no loop carried dependence on the variable V in the SCR 715, and that there is copy out of the variable V on exit from the SCR 715 and only the last iteration needs to be copied. Variable V is not private in SCR 740 as there is a loop carried dependence on the variable V in the SCR 740. Thereafter, decision block 460 determines if there is a remaining candidate variable V having at least one definition in SCR R to be processed by the loop starting at process block 435. If there is a remaining variable, then processing loops back to process block 435 to process this remaining variable.

Returning now to decision block 460, if there is not a remaining candidate variable V having at least one definition in SCR R to be processed, then decision block 465 determines if there is a remaining candidate SCR to be processed by the loop starting at process block 430. If there is a remaining candidate SCR, then processing loops back to process block 430 to process this remaining candidate SCR.

Returning now to decision block 465, if there is not a remaining candidate SCR to be processed, then the process ends at process block 470.

Figure 5:
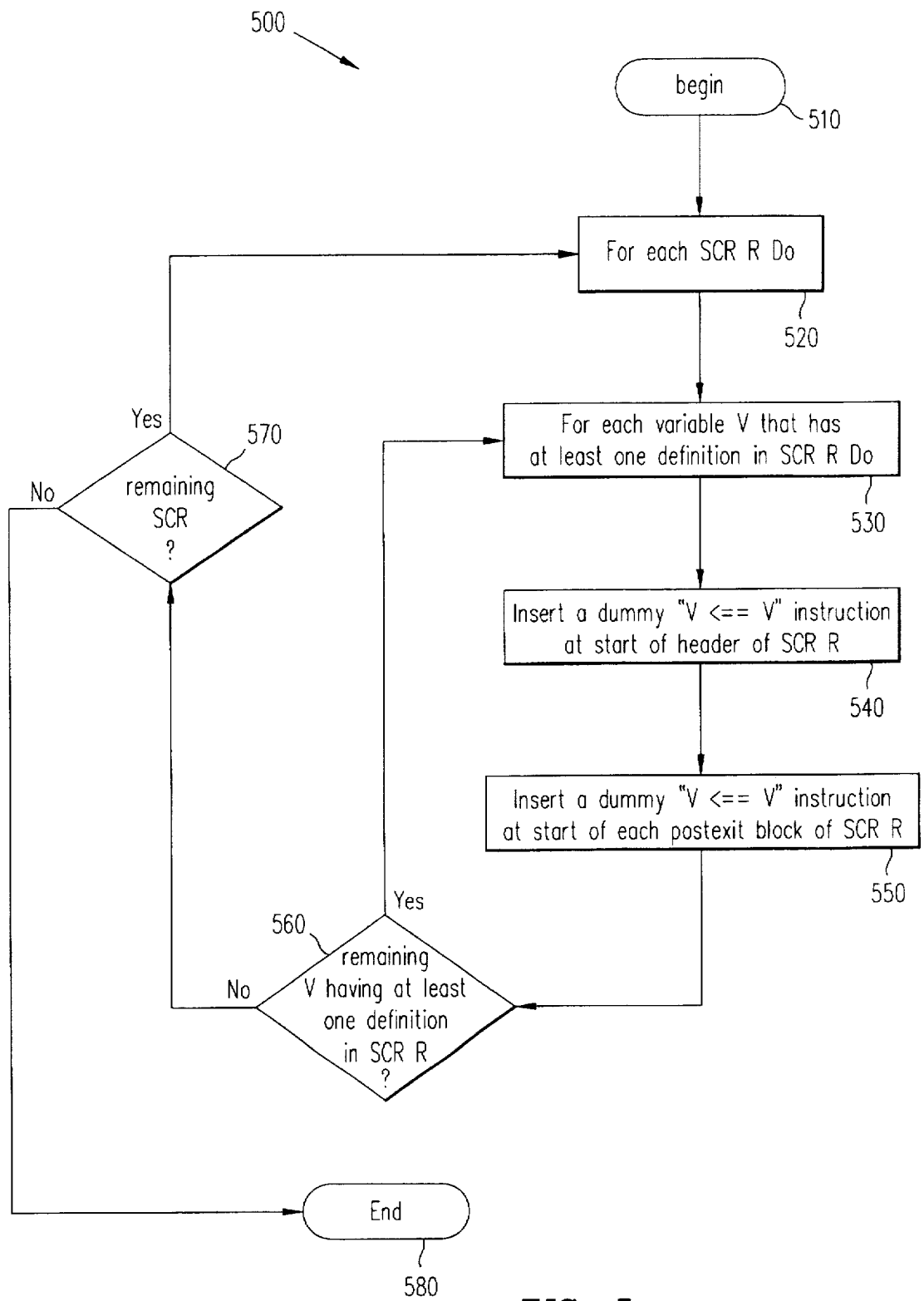
FIG. 5 shows a flowchart of the operations preferred in carrying out the Insertion of Dummy Identity Assignment Statements portion of the present invention, and is an elaboration of process block 420 of FIG. 4.

Referring next to FIG. 5, the operations preferred in carrying out the Insertion of Dummy Identity Assignment Statements portion 500 of the present invention are illustrated. This is an elaboration of process block 420 of FIG. 4. The process begins at process block 510, and thereafter, process block 520 begins a loop for each SCR R to insert dummy assignments in each SCR R if applicable. Nested within this loop, process block 530 begins a loop for each variable V within an SCR R that has at least one definition in SCR R. Within this loop, process block 540 inserts a dummy "V<==V" instruction at start of the header block of SCR R. For example, process block 540 inserts dummy instruction 770 in header block 720 of SCR 715, and it also inserts dummy instruction 780 in header block 745 of SCR 740. Thereafter, process block 550 inserts a dummy "V<= =V" instruction at start of each postexit block of SCR R. For example, process block 550 inserts dummy instruction 775 in postexit block 760 of SCR 715, and it also inserts dummy instruction 785 in postexit block 755 of SCR 740. Thereafter, decision block 560 determines if there is a remaining variable V within an SCR R that has at least one definition in SCR R. If there is a remaining variable to be processed, then the process loops back to process block 530 to process the remaining variable within SCR R.

Returning now to decision block 560, if there is not a remaining variable to be processed, then decision block 570 determines if there is a remaining SCR R to processed. If there is a remaining SCR, then the process loops back to process block 520 to process the remaining SCR R.

Returning now to decision block 570, if there is not a remaining SCR R to processed, then the process ends at process block 580.

Figure 8:
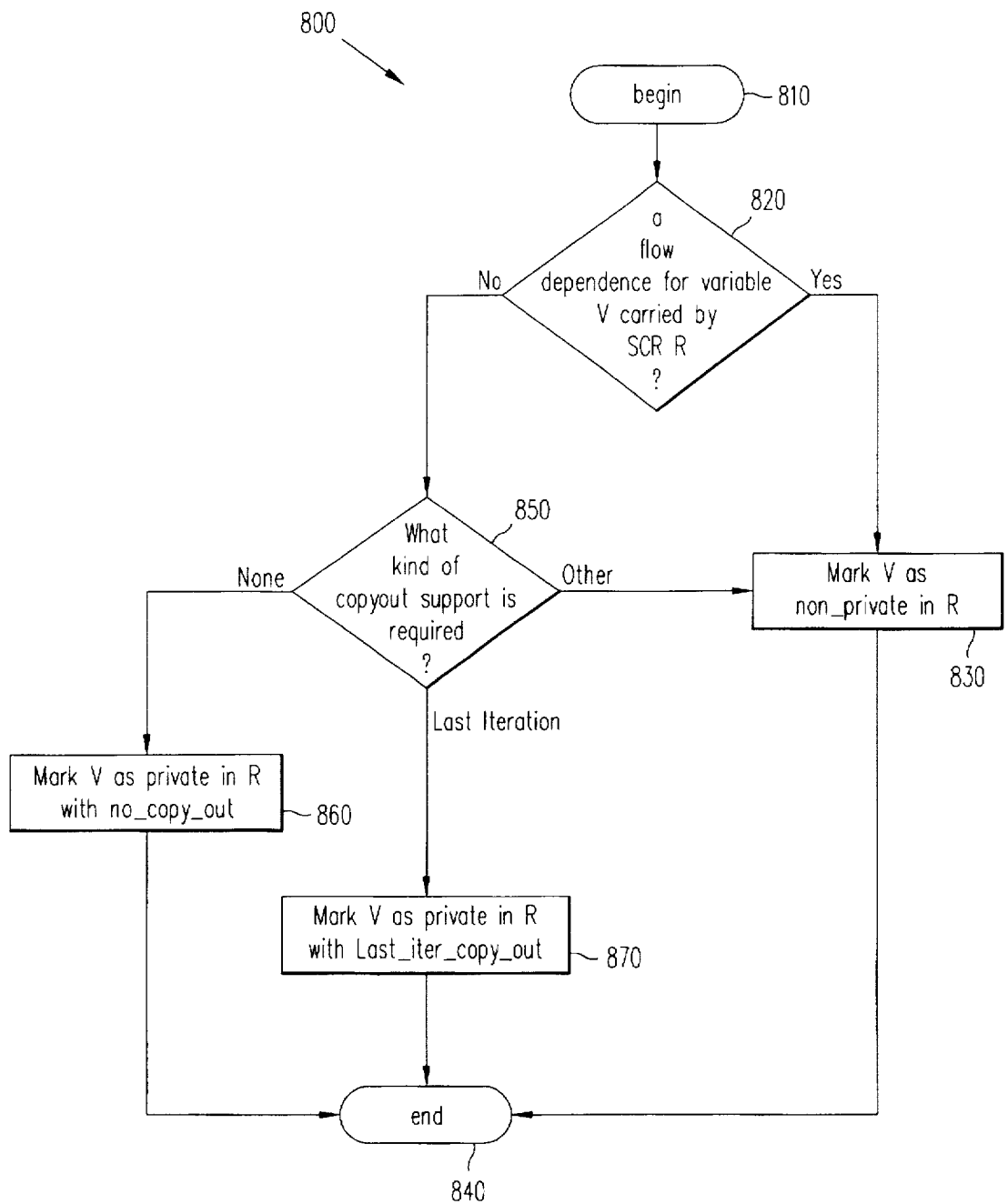
FIG. 8 shows a flowchart of the operations preferred in carrying out the Privatization Test 800 portion of the present invention, and is an elaboration of process blocks 440, 445, 450, and 455 of FIG. 4.

Referring now to FIG. 8, a flowchart illustrating the operations preferred in carrying out the Privatization Test 800 portion of the present invention is shown. The Privatization Test 800 is an elaboration of process blocks 440, 445, 450, and 455 of FIG. 4. The process begins at process block 810, and thereafter, decision block 820 determines if there a flow dependence for variable V carried by SCR R. If there is a flow dependence for variable V carried by SCR R, then process block 830 marks V as non_private in R, and then the process ends at process block 840. For the SCR 740, decision block 820 determines that there is a flow dependence for variable V carried by SCR 740, as the value of variable V computed in an iteration is used in the next iteration, and thus process block 830 marks V as non__ private in SCR 740.

Returning now to decision block 820, if there is not a flow dependence for variable V carried by SCR R, then decision block 850 determines what kind of copyout support is required, either none, last iteration with copy out, or other. If decision block 850 determines no copyout support is required, then process block 860 marks V as private in R with no_copy_out, and then the process ends at process block 840.

Returning now to decision block 850, if last iteration copyout support is required, then process block 870 marks V as private in SCR R with last iteration copyout, and then the process ends at process block 840. For the SCR 715, decision block 820 determines that there is no flow dependence for variable V carried by SCR 715 as it is overwritten before use during each iteration of the loop; decision block 850 determines that last iteration copyout support is required for variable V because of its use in the printf statement of basic block 760; and then process block 870 marks variable V as private in SCR 715 with last iteration copyout.

Returning now to decision block 850, if copyout support other than last iteration copyout or none is required, then process block 830 marks V as non_Private in R, and then the process ends at process block 840.

Figure 9:
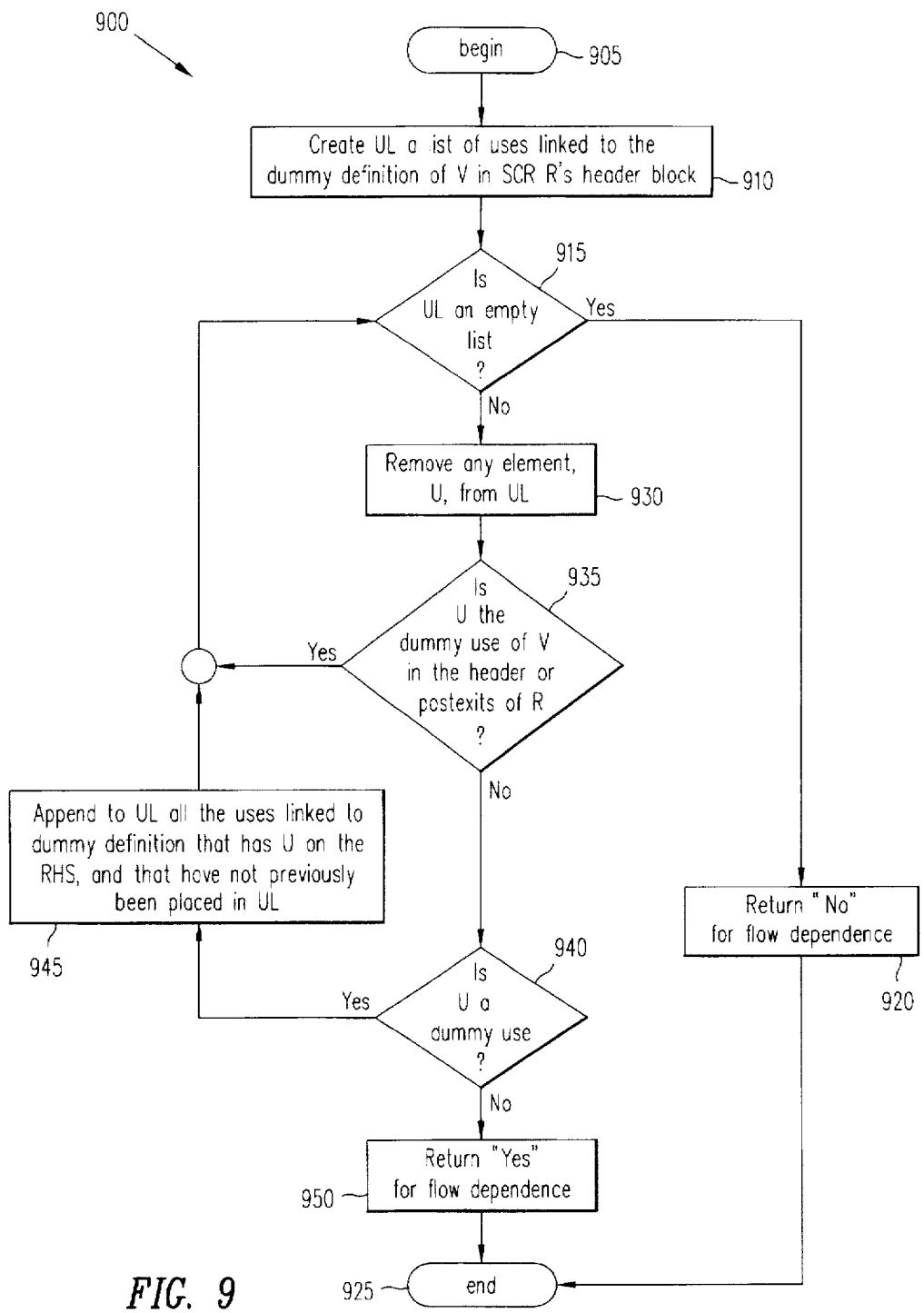
FIG. 9 shows a flowchart of the operations preferred in carrying out the Loop-Carried Flow Dependence Test portion of the present invention, and is an elaboration of process block 820 of FIG. 8.

Referring now to FIG. 9, a flowchart illustrating the operations preferred in carrying out the Loop-Carried Flow Dependence Test 900 portion of the present invention is shown. The Loop-Carried Flow Dependence Test 900 is an elaboration of process block 820 of FIG. 8. The process begins at process block 905, and thereafter, process block 910 creates a USE list, UL, which is a list of uses linked to the dummy definition of V in SCR R's header block, as specified by the USE function. Thereafter, decision block 915 determines if UL is an empty list. If UL is an empty list, then process block 920 returns "No" indicating that there is no flow dependence for variable V carried by SCR R. Thereafter, the process ends at process block 925. For the variable V in SCR 715, process block 910 creates an empty UL as there are no uses of variable V linked to dummy definition 770, since it is overwritten or redefined in either basic block 730 or basic block 735. As the UL list for variable V is empty, then process block 920 returns "No" indicating that there is no flow dependence for variable V carried by SCR 715.

Returning now to decision block 915, if UL is not an empty list, then process block 930 removes an element, any element U, from UL, and decision block 935 determines if the element U is the dummy use of V in the header block or in a postexit block of SCR R. If the element U is the dummy use of V in the header block or in a postexit block of SCR R, then the process loops back to decision block 915 to process any remaining elements in UL.

Returning now to decision block 935, if the element U is not a dummy use of V in the header block or in a postexit block of SCR R, then decision block 940 determines if U is a dummy use in a block other than the header block or postexit blocks of SCR R. If U is such a dummy use, then process block 945 appends to UL all the uses linked to the dummy definition that have U on the RHS and that have not previously been placed in UL. Then the process loops back to decision block 915 to process any remaining elements in UL. Although process block 945 is not used on the sample program 600, if the sample program 600 and control flow graph 700 are modified such that basic block 730 and basic block 735 are deleted, then in this modified example, process block 945 appends uses of V linked to dummy definition 780 in SCR 740 (the non-dummy uses in basic blocks 745 and 750) to the UL of variable V in SCR 715.

Returning now to decision block 940, if U is not a dummy use in a block other than the header block or postexit blocks of SCR R, then process block 950 returns "Yes" for flow dependence indicating that there is a flow dependence for variable V carried by SCR R, since at least one definition in SCR R must reach use U via a path that goes through the header block of SCR R. Thereafter, the process ends at process block 925. For the variable V in SCR 740, process block 910 builds a non-empty UL comprising three uses from basic block 745 (c[v]=), basic block 745 (=d[v]), and basic block 750 (=c[v]), and decision block 915 determines that the UL is not an empty list. Decision block 935 determines that not any of the three uses is a dummy use in the header block 745 or postexit block 755 of SCR 740. Decision block 940 determines that not any of the three uses is a dummy use, and then process block 950 returns "Yes" for flow dependence indicating that there is a flow dependence for variable V carried by SCR 740.

Figure 10:
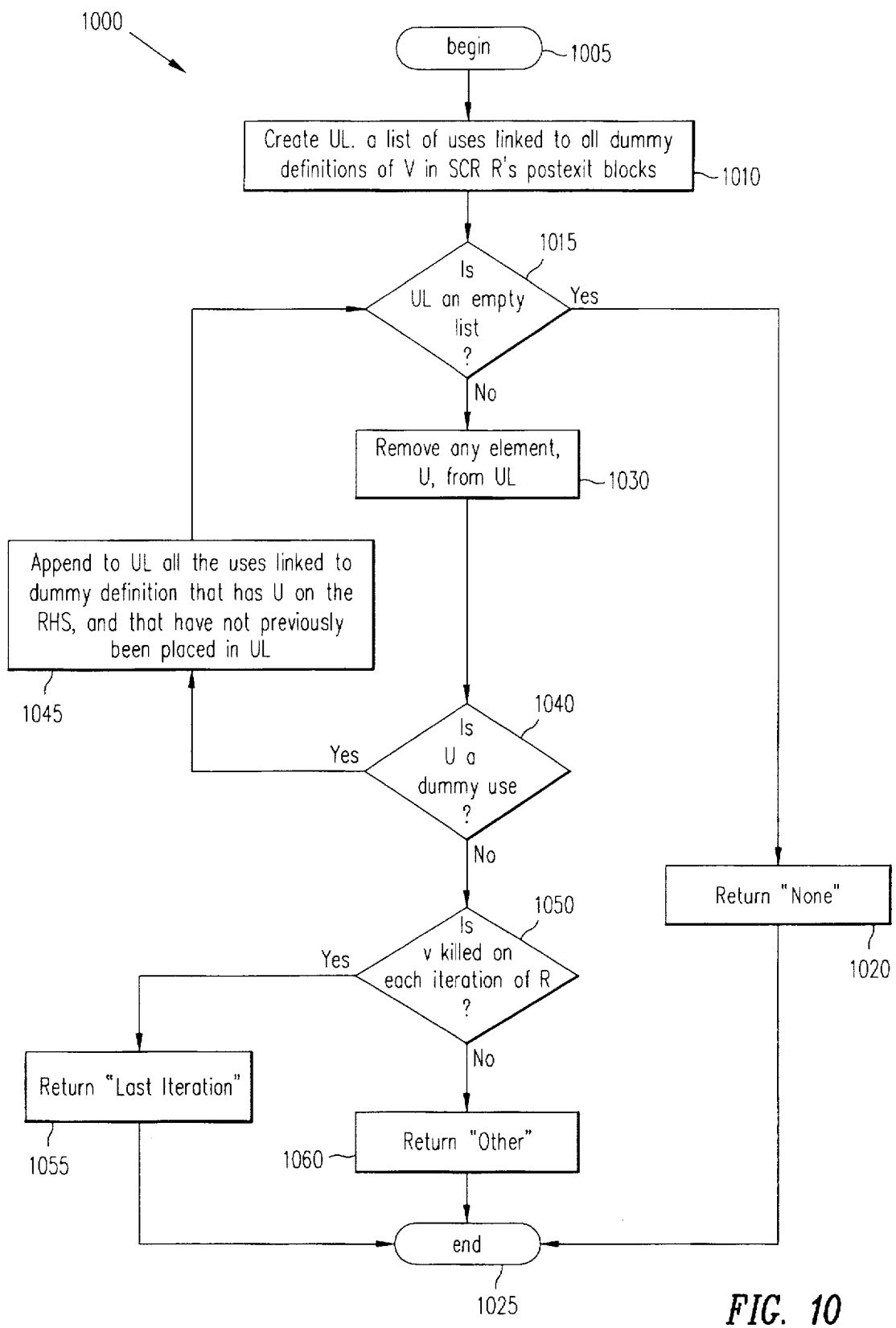
FIG. 10 shows a flowchart of the operations preferred in carrying out the CopyOut Identification portion of the present invention, and is an elaboration of process block 850 of FIG. 8.

Referring now to FIG. 10, a flowchart illustrating the operations preferred in carrying out the CopyOut Identification 1000 portion of the present invention is shown. The CopyOut Identification 1000 is an elaboration of process block 850 of FIG. 8. The process begins at process block 1005, and thereafter, process block 1010 creates a USE list, UL, which is a union of the lists of uses linked to all dummy definitions of V in SCR R's postexit blocks. Thereafter, decision block 1015 determines if UL is an empty list. If UL is an empty list, then process block 1020 returns "None" indicating that no copyout support is required. Thereafter, the process ends at process block 1025.

Returning now to decision block 1015, if UL is not an empty list, then process block 1030 removes an element, any element U, from UL, and then decision block 1040 determines if U is a dummy use. If U is a dummy use, then process block 1045 appends to UL all the uses linked to dummy definition that has U on the RHS and that have not previously been placed in UL, and then the process loops back to decision block 1015 to process any remaining elements in UL.

Returning now to decision block 1040, if U is not a dummy use, then decision block 1050 determines if V is killed on each iteration of SCR R. If V is killed on each iteration of SCR R, then process block 1055 returns "Last Iteration" indicating that last iteration copyout support is required for variable V. Thereafter, the process ends at process block 1025. For variable V in SCR 715, process block 1010 builds a single entry UL comprising the use in basic block 760 (printf( . . . , v)). After decision block 1015 determines the UL is not empty, decision block 1040 determines that the use is not a dummy use. Then decision block 1050 determines that the use is killed on each iteration of SCR 715, and process block 1055 returns "Last Iteration" indicating that last iteration copyout support is required for variable V in SCR 715.

Returning now to decision block 1050, if V is not killed on each iteration of SCR R, then process block 1060 returns "Other" indicating that support other than last iteration copyout or none is required for variable V in SCR R. Thereafter, the process ends at process block 1025.

Figure 11:
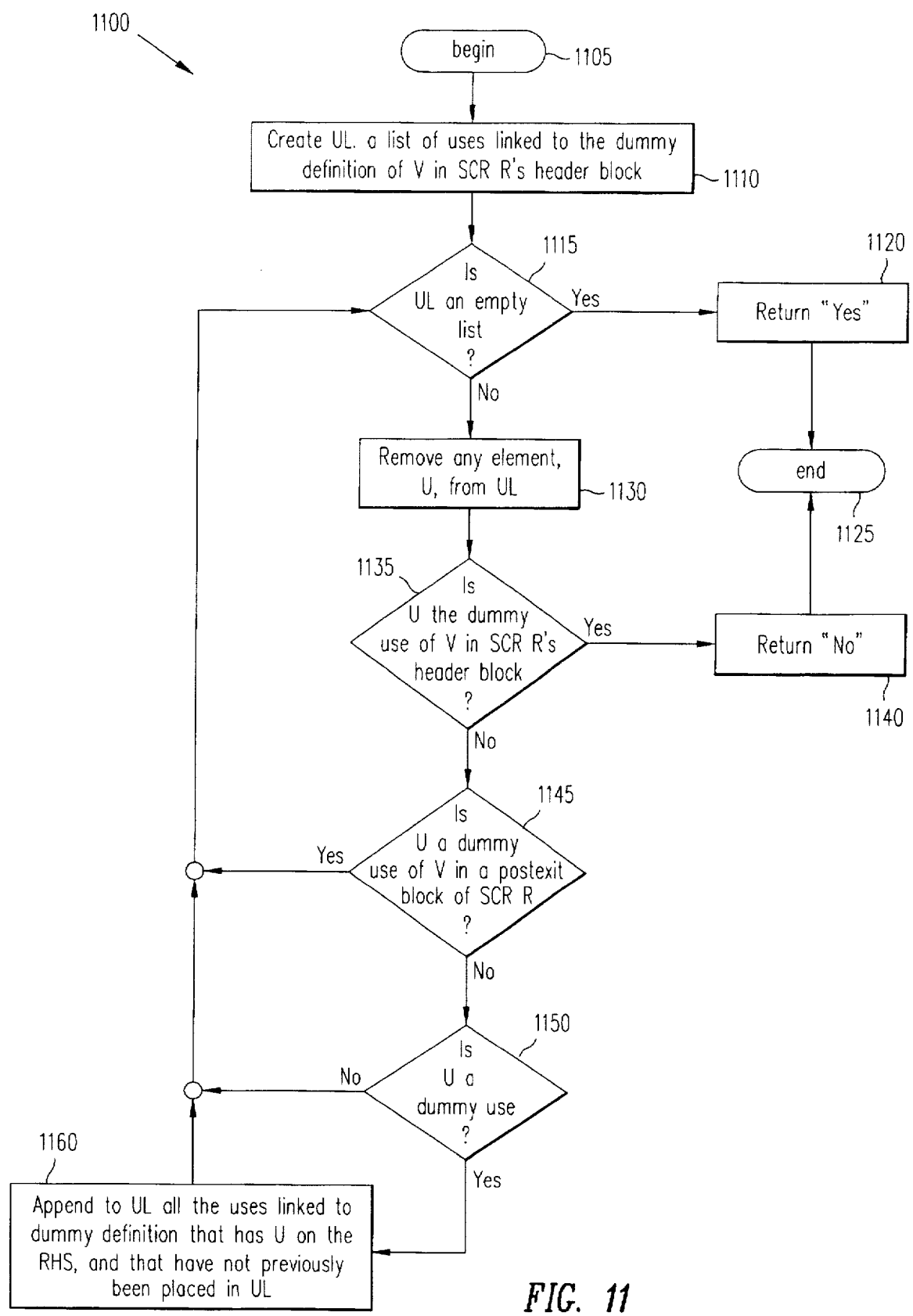
FIG. 11 shows a flowchart of the operations preferred in carrying out the Kill Test portion of the present invention, and is an elaboration of process block 1050 of FIG. 10.

Referring now to FIG. 11, a flowchart illustrating the operations preferred in carrying out the Kill Test 1100 portion of the present invention is shown. The Kill Test 1100 is an elaboration of process block 1050 of FIG. 10. The process begins at process block 1105, and thereafter, process block 1110 creates a USE list, UL, which is a list of uses linked to all dummy definitions of V in SCR R's header block. Thereafter, decision block 1115 determines if UL is an empty list. If UL is an empty list, then process block 1120 returns "Yes" indicating that the variable V is killed on each iteration of SCR R. Thereafter, the process ends at process block 1125. For the variable V in SCR 715, process block 1110 creates an empty UL as there are no uses of variable V linked to dummy definition 770, since V is overwritten or redefined in either basic block 730 or basic block 735. As the UL list for variable V is empty, then process block 1120 returns "Yes" indicating that the variable V is killed on each iteration of SCR 715.

Returning now to decision block 1115, if UL is not an empty list, then process block 1130 removes an element, any element U, from UL, and decision block 1135 determines if the element U is the dummy use of V in the header block of SCR R. If the element U is the dummy use of V in the header block of SCR R, then process block 1140 returns "No" indicating that the variable V is not killed on each iteration of SCR R. Thereafter, the process ends at process block 1125.

Returning now to decision block 1135, if the element U is not a dummy use of V in the header block of SCR R, then decision block 1145 determines if U is a dummy use in a postexit block of SCR R. If U is such a dummy use, then the process loops back to decision block 1115 to process any remaining elements in UL.

Returning now to decision block 1145, if U is not a dummy use in a postexit block of SCR R, then decision block 1150 determines if V is a dummy use in a block other than the header block or a postexit block of SCR R. If V is such a dummy use, process block 1160 appends to UL all the uses linked to dummy definition that has U on the RHS and that have not previously been placed in UL, and then the process loops back to decision block 1115 to process any remaining elements in UL.

Returning now to decision block 1150, if V is not a dummy use in a block other than the header block or a postexit block of SCR R, then the process loops back to decision block 1115 to process any remaining elements in UL.

Figure 12:
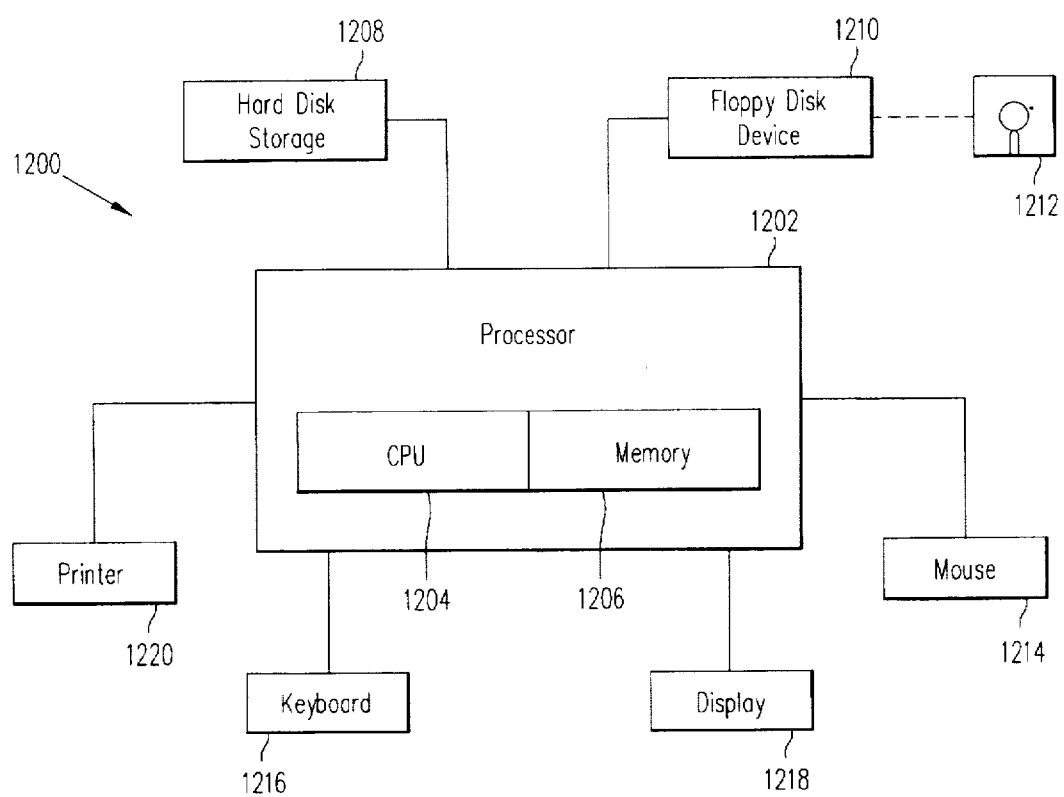
FIG. 12 is a block diagram of a computer system used in performing the method of the present invention, forming part of the apparatus of the present invention, and which may use the article of manufacture comprising a computer-readable storage medium having a computer program embodied in said medium which may cause the computer system to practice the present invention.

Referring now to FIG. 12, a block diagram illustrates a computer system 1200 used in performing the method of the present invention, forming part of the apparatus of the present invention, and which may use the article of manufacture comprising a computer-readable storage medium having a computer program embodied in said medium which may cause the computer system to practice the present invention. The computer system 1200 includes a processor 1202, which includes a central processing unit (CPU) 1204, and a memory 1206. Additional memory, in the form of a hard disk file storage 1208 and a computer-readable storage device 1210, may be connected to the processor 1202. Computer-readable storage device 1210 receives a computer-readable storage medium 1212 having a computer program embodied in said medium which may cause the computer system to implement the present invention in the computer system 1200. The computer system 1200 may also include user interface hardware, including a mouse 1214 and a keyboard 1216 for allowing user input to the processor 1202 and a display 1218 for presenting visual data to the user. The computer system may also include a printer 1220.

In an alternative embodiment of the present invention, scalar replacement of array and pointer references may be used as a pre-pass step to the above preferred embodiment so that privatization of array and pointer references may be handled by the present invention.

Although the present invention has been particularly shown and described with reference to a preferred embodiment, it will be understood by those skilled in the art that various changes in form and detail may be made without departing from the spirit and the scope of the invention.

I claim:

1. A method of identifying a private variable in a single-entry strongly connected region, said method comprising the steps of:
    inserting a dummy identity assignment statement in a header block of the single-entry strongly connected region for a variable with a definition in the single-entry strongly connected region, said header block comprising a basic block within the single-entry strongly connected region which has a predecessor not contained in the single-entry strongly connected region; and
    determining a USE function for the inserted dummy identity assignment statement.

2. The method of claim 1 further comprising the step of:
    using the dummy definition of the variable in the header block to test if there exists a loop-carried flow dependence on the variable in the single-entry strongly connected region.

3. The method of claim 1 further comprising the step of:
    using the dummy definition of the variable in the header block to test if only a last iteration value of the variable needs to be copied out.

4. The method of claim 1 wherein the inserting step further comprises:
    inserting a dummy identity assignment statement in a postexit block of the single-entry strongly connected region for the variable with the definition in the single-entry strongly connected region, said postexit block comprising a target of an edge exiting the single-entry strongly connected region.

5. The method of claim 4 further comprising the step of:
    using the dummy definition of the variable in the postexit block to test if the variable is required to be copied out on exit from the single-entry strongly connected region.

6. A method of identifying a private variable in a single-entry strongly connected region, said method comprising the steps of:
    inserting a dummy identity assignment statement in a header block of the single-entry strongly connected region for a variable with a definition in the single-entry strongly connected region, said header block comprising a basic block within the single-entry strongly connected region which has a predecessor not contained in the single-entry strongly connected region;
    inserting a dummy identity assignment statement in a postexit block of the single-entry strongly connected region for the variable with the definition in the single-entry strongly connected region, said postexit block comprising a target of an edge exiting the single-entry strongly connected region;
    determining a USE function for the inserted dummy identity assignment statements;
    using the dummy definition of the variable in the header block to test if there exists a loop-carried flow dependence on the variable in the single-entry strongly connected region;
    using the dummy definition of the variable in the header block to test if only a last iteration value of the variable needs to be copied out;
    using the dummy definition of the variable in the postexit block to test if the variable is required to be copied out on exit from the single-entry strongly connected region; and
    identifying the variable as a private variable if there is no loop carried dependence of the variable, and either: no copy out on exit of the variable, or copy out on exit of the variable and only a last iteration of the variable needs to be copied.

7. A computer system for identifying a private variable in a single-entry strongly connected region, said computer system comprising:
    means for inserting a dummy identity assignment statement in a header block of the single-entry strongly connected region for a variable with a definition in the single-entry strongly connected region, said header block comprising a basic block within the single-entry strongly connected region which has a predecessor not contained in the single-entry strongly connected region; and
    means for determining a USE function for the inserted dummy identity assignment statement.

8. The computer system of claim 7 further comprising:
    means for the dummy definition of the variable in the header block to test if there exists a loop-carried flow dependence on the variable in the single-entry strongly connected region.

9. The computer system of claim 7 further comprising:

means for using the dummy definition of the variable in the header block to test if only a last iteration value of the variable needs to be copied out.

10. The computer system of claim 7 wherein the means for inserting further comprises:

means for inserting a dummy identity assignment statement in a postexit block of the single-entry strongly connected region for the variable with the definition in the single-entry strongly connected region, said postexit block comprising a target of an edge exiting the single-entry strongly connected region.

11. The computer system of claim 10 further comprising:

means for using the dummy definition of the variable in the postexit block to test if the variable is required to be copied out on exit from the single-entry strongly connected region.

12. A computer system for identifying a private variable in a single-entry strongly connected region, said computer system comprising:

means for inserting a dummy identity assignment statement in a header block of the single-entry strongly connected region for a variable with a definition in the single-entry strongly connected region, said header block comprising a basic block within the single-entry strongly connected region which has a predecessor not contained in the single-entry strongly connected region;

means for inserting a dummy identity assignment statement in a postexit block of the single-entry strongly connected region for the variable with the definition in the single-entry strongly connected region, said postexit block comprising a target of an edge exiting the single-entry strongly connected region;

means for determining a USE function for the inserted dummy identity assignment statements;

means for using the dummy definition of the variable in the header block to test if there exists a loop-carried flow dependence on the variable in the single-entry strongly connected region;

means for using the dummy definition of the variable in the header block to test if only a last iteration value of the variable needs to be copied out;

means for using the dummy definition of the variable in the postexit block to test if the variable is required to be copied out on exit from the single-entry strongly connected region; and means for identifying the variable as a private variable if there is no loop carried dependence of the variable, and either: no copy out on exit of the variable, or copy out on exit of the variable and only a last iteration of the variable needs to be copied.

13. An article of manufacture for use in a computer system identifying a private variable in a single-entry strongly connected region, said article of manufacture comprising a computer-readable storage medium having a computer program embodied in said medium which may cause the computer system to:

insert a dummy identity assignment statement in a header block of the single-entry strongly connected region for a variable with a definition in the single-entry strongly connected region, said header block comprising a basic block within the single-entry strongly connected region which has a predecessor not contained in the single-entry strongly connected region; and determine a USE function for the inserted dummy identity assignment statement.

14. The article of manufacture of claim 13 wherein the computer program may further cause the computer system to:

use the dummy definition of the variable in the header block to test if there exists a loop-carried flow dependence on the variable in the single-entry strongly connected region.

15. The article of manufacture of claim 13 wherein the computer program may further cause the computer system to:

use the dummy definition of the variable in the header block to test if only a last iteration value of the variable needs to be copied out.

16. The article of manufacture of claim 13 wherein the inserting may further cause the computer system to:

insert a dummy identity assignment statement in a postexit block of the single-entry strongly connected region for the variable with the definition in the single-entry strongly connected region, said postexit block comprising a target of an edge exiting the single-entry strongly connected region.

17. The article of manufacture of claim 16 wherein the computer program may further cause the computer system to:

use the dummy definition of the variable in the postexit block to test if the variable is required to be copied out on exit from the single-entry strongly connected region.

18. An article of manufacture for use in a computer system identifying a private variable in a single-entry strongly connected region, said article of manufacture comprising a computer-readable storage medium having a computer program embodied in said medium which may cause the computer system to:

insert a dummy identity assignment statement in a header block of the single-entry strongly connected region for a variable with a definition in the single-entry strongly connected region, said header block comprising a basic block within the single-entry strongly connected region which has a predecessor not contained in the single-entry strongly connected region;

insert a dummy identity assignment statement in a postexit block of the single-entry strongly connected region for the variable with the definition in the single-entry strongly connected region, said postexit block comprising a target of an edge exiting the single-entry strongly connected region;

determine a USE function for the inserted dummy identity assignment statements;

use the dummy definition of the variable in the header block to test if there exists a loop-carried flow dependence on the variable in the single-entry strongly connected region;

use the dummy definition of the variable in the header block to test if only a last iteration value of the variable needs to be copied out;

use the dummy definition of the variable in the postexit block to test if the variable is required to be copied out on exit from the single-entry strongly connected region; and identify the variable as a private variable if there is no loop carried dependence of the variable, and either: no copy out on exit of the variable, or copy out on exit of the variable and only a last iteration of the variable needs to be copied.

* * * * *